United States Patent Office 3,343,974
Patented Sept. 26, 1967

3,343,974
COMPOSITIONS FOR INCREASING THE DISPERSION STABILITY OF TITANIUM DIOXIDE PIGMENT
Raymond Noel Faulkner, Hanworth, Middlesex, and Edwin Enfield Berry, Twickenham, Middlesex, England, assignors to the United States of America as represented by the Secretary of Agriculture
No Drawing. Filed May 13, 1964, Ser. No. 367,261
5 Claims. (Cl. 106—300)

A nonexclusive, irrevocable, royalty-free license in the invention herein described, throughout the world for all purposes of the United States Government, with the power to grant sublicenses for such purposes, is hereby granted to the Government of the United States of America.

This invention relates to an unobvious method of pretreating rutile (titanium dioxide pigment) to greatly increase its dispersibility.

Rutile is a mineral pigment that is widely employed in paints, enamels, and ceramics, and the well known tendency of it and other paint pigments to settle has evoked many efforts at improvement.

The object of our invention is a novel treatment for rutile which tremendously improves the stability of dispersions, as demonstrated in a widely employed paint solvent, namely naphtha. Another object is a novel solution for treating rutile.

In accordance with the objects of the instant invention we have now discovered that a rather brief contact as by shaking or stirring rutile in a very dilute solution of phosphorylated (P-acid) methyl oleate in acetone or in a corresponding solution in ethylene glycol monoethyl ether followed preferably by a washing in fresh solution and drying of the treated pigment impressively improves its dispersibility as demonstrated in naphtha and shown by the data of Table I.

Our novel treatment compositions comprise approximately 0.4 percent solutions of phosphorylated (P-acid) methyl oleate in either ethylene glycol monoethyl ether or in acetone. Presumably somewhat different concentrations of the phosphorylated methyl oleate would provide effects differing in degree and, likewise, it would be reasonable to assume that other glycol ethers such as ethylene glycol monobutyl ether or diethylene glycol monoethyl ether would also be operative, differing only in degree.

The phosphorylated (P-acid) methyl oleate constituent of our novel treatment compositions is known, see Jungermann et al., J. Org. Chem. 27: 606 (1962), and we employed a molecular distillation residue characterized by $n_D^{20}$ 1.489 and acid value of 155.

The experiments illustrated by the data of Table I involved the formation of essentially 0.4 percent solutions of the phosphorylated (P-acid) methyl oleate in acetone and in ethylene glycol monoethyl ether by adding 0.2 g. of the oleate to 50 ml. of the organic solvent. The pure solvents were employed as controls, and for comparison purposes identical proportions of methyl oleate and of stearic acid were dissolved in the respective solvents.

Respective 20 g. portions of $TiO_2$ were stirred for 10 minutes in flasks containing either 50 ml. of a said solvent or the same plus 0.2 g. of an additive. After recovering the rutile by filtration, it was washed once in another 50 ml. of the material in which it had been stirred, refiltered, and dried. Five gram portions of the respectively treated dry rutile powders were then shaken for 0.5 minute in stoppered bottles each containing 50 ml. of naphtha. After standing for 5 minutes the top 10 ml. of each suspension was pipetted off, evaporated to dryness, and the weight of suspended pigment obtained. The data of Table I shows that phosphorylated (P-acid) methyl oleate phenomenally increases the dispersion stability of rutile in naphtha when the treatment is carried out in ethylene glycol monoethyl ether. This effect is not believed to be the result of a chemical reaction inasmuch as a washing of the treated pigment with ethylene glycol monoethyl ether apparently removed the adsorbed solution as shown by a reduction in the weight of suspended pigment in the above test to a value of only about 7.5 mg.

TABLE I.—*Dispersion of rutile titanium dioxide using phosphorylated methyl oleate*

| Treatment of $TiO_2$ | Wt. of suspended pigment, mg. |
|---|---|
| Acetone alone | 2.0 |
| Acetone/methyl oleate | 2.8 |
| Acetone/stearic acid | 2.1 |
| Acetone/phosphorylated methyl oleate | 6.0 |
| Ethylene glycol monoethyl ether alone | 0 |
| Ethylene glycol monoethyl ether/methyl oleate | 3.8 |
| Ethylene glycol monoethyl ether/stearic acid | 1.8 |
| Ethylene glycol monoethyl ether/phosphorylated methyl oleate | 172.6 |

Having disclosed our invention we claim:

1. A dispersant composition comprising 0.4 percent by weight of phosphorylated (P-acid) methyl oleate in an organic solvent selected from the group consisting of acetone and ethylene glycol monoethyl ether.
2. A composition according to claim 1 wherein the organic solvent is ethylene glycol monoethyl ether.
3. A composition according to claim 1 wherein the organic solvent is acetone.
4. A process for increasing the dispersion stability of titanium dioxide pigment comprising mixing the pigment for about 5 minutes in a composition of claim 1, recovering the pigment, washing the pigment in fresh composition, and drying the pigment.
5. A process according to claim 4 wherein the composition is a solution of phosphorylated (P-acid) methyl oleate in ethylene glycol monoethyl ether.

References Cited

UNITED STATES PATENTS

| 1,946,054 | 2/1934 | Baldwin | 106—308 |
| 2,215,857 | 6/1940 | Plechnev et al. | 106—308 |
| 2,287,416 | 6/1942 | Dann | 106—309 |
| 2,555,972 | 6/1951 | Karjala et al. | 260—403 |
| 3,022,185 | 2/1962 | Delfosse | 106—300 |
| 3,259,671 | 6/1966 | Jungermann et al. | 260—403 |

HELEN M. McCARTHY, *Primary Examiner.*

TOBIAS E. LEVOW, *Examiner.*

S. E. MOTT, *Assistant Examiner.*